May 12, 1931. J. E. MITCHELL 1,805,221
COMBINATION FEEDER CLEANER AND EXTRACTING MACHINE
Filed Sept. 23, 1929
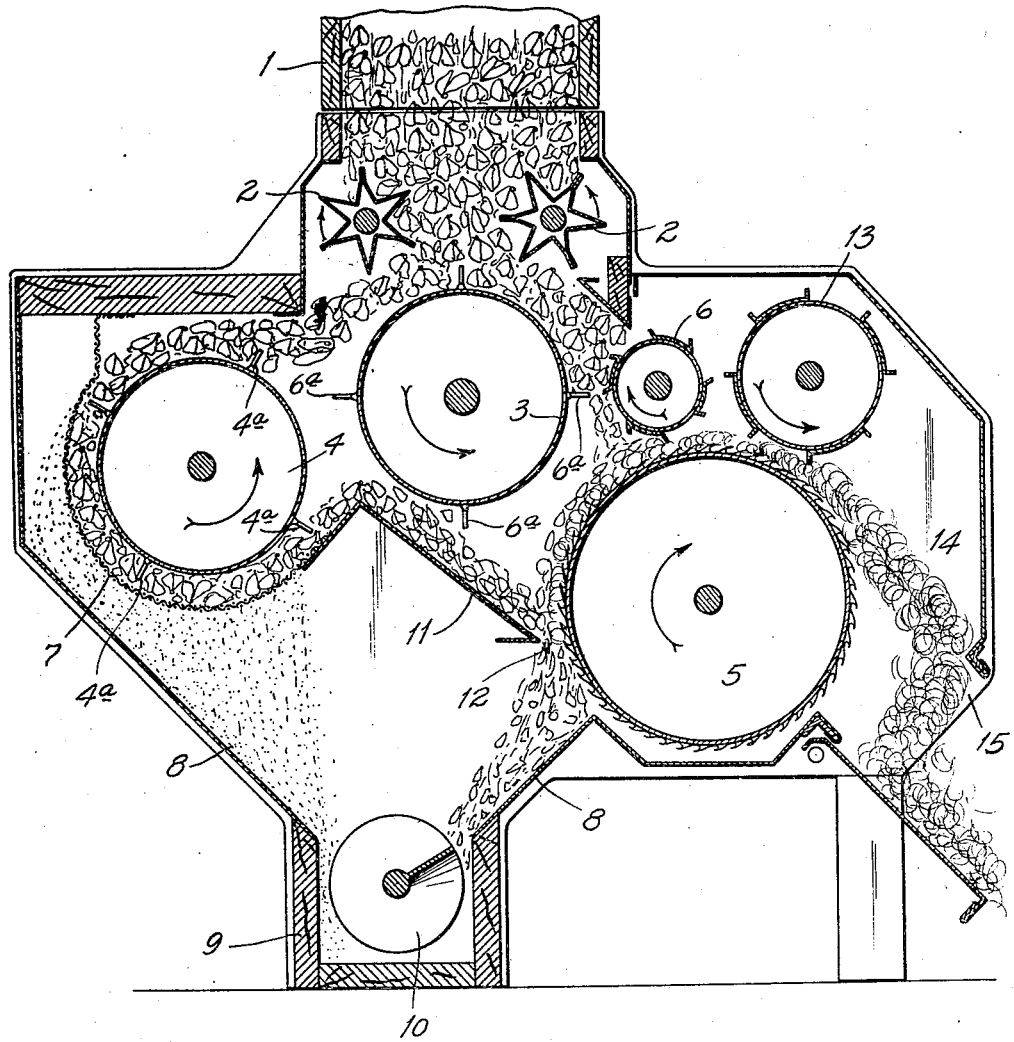
INVENTOR:
JOHN E. MITCHELL
By Bruce S. Elliott
ATTORNEY.

Patented May 12, 1931

1,805,221

UNITED STATES PATENT OFFICE

JOHN E. MITCHELL, OF DALLAS, TEXAS

COMBINATION FEEDER-CLEANER AND EXTRACTING MACHINE

Application filed September 23, 1929. Serial No. 394,528.

The general object of this invention is to provide a novel combination feeder-cleaner and extracting machine, and which, in effect, is an improvement on the boll-breaking and cotton-separating machine described and illustrated in my prior Patent No. 1,694,480, dated December 11th, 1928.

The machine of the present application is intended more particularly for use in cleaning roughly-harvested cotton. By this latter term is meant cotton which is gathered by machines, as distinguished from cotton which has been picked by hand.

The roughly-harvested cotton which cotton cleaning machines of the present day are required to handle, consists of a mixture of loose cotton, hulls, partly opened bolls, closed bolls, sticks, stems, and leaf trash.

The machine of my prior patent referred to has, in practice, proven highly effective in handling ordinary boll cotton, but does not meet the requirements in respect to separating out the leaf trash; furthermore, when the cotton contains a very large percentage of sticks and closed bolls there is a tendency to overload the single breaker or picker cylinder located below the feed rolls, because of the large amount of bolls not sufficiently opened or broken, or of cotton entangled with sticks being returned to the breaker or picker cylinder by the kicker roll.

This objection is overcome by the present invention, in which a supplemental cleaning cylinder is employed located in cooperative relation to the picker cylinder and partly surrounded by a screen, which cleaning cylinder, aside from being effective in removing the fine leaf trash, also assists the picker cylinder in breaking the bolls and knocking hulls and sticks loose from the cotton, thus preventing overloading of the picker cylinder by too much of the stream being returned to it by the kicker roller.

There are further advantages incident to the construction of machine forming the embodiment of my present invention, but these will be better understood after a description of the machine and its operation, which will now be given, referring to the accompanying drawing, in which the figure is a longitudinal sectional view, the conventional driving mechanism not being illustrated, but the direction of rotation of the various members being shown by arrows.

Referring now to the drawing, the numeral 1 indicates a hopper which is located above my improved machine and is adapted to receive the seed cotton mixed with hulls, trash, etc., as it is drawn from the wagons. In ordinary practice, of course, there will be a line of my improved machines mounted on the gins and a line of hoppers over them, and the cotton will be distributed by the operator to the various hoppers. The drawing, however, illustrates only one machine and one hopper. For withdrawing the cotton from the hopper, I provide feeding mechanism which is preferably in the form of two fluted rollers 2, the upper parts of which rotate toward each other so as to withdraw the cotton from the hopper 1. The feed rollers are rotated at such speed as to withdraw the cotton in a stream regulated to suit the capacity of the gin on which the machine is mounted. Located below the feed rollers 2 is a double-feed picker cylinder 3 which, as hereinafter more fully described, cooperates with the feed rollers 2, with the cleaning cylinder 4, with a saw cylinder 5, and a kicker roller 6. In the present instance, the picker cylinder 3 is preferably in the form of a hollow drum carrying spikes 6a on its periphery. In my patent referred to, I have shown this element in the form of a cylinder having breaker arms pivotally mounted on its periphery. Either form of cylinder may be used and for the purpose of the present invention, one may be considered the equivalent of the other, as they perform the same function.

The separator or cleaning feature of the invention comprises the cleaning cylinder 4, previously referred to, which likewise may be in the form of a hollow drum provided on its periphery with spikes 4a, and this cylinder is driven at a speed sufficient to assist in breaking the bolls. Mounted below the cylinder 4 is a screen 7. The cleaning cylinder and screen are located in the upper part of a hopper 8 which terminates in a trough 9 in which is located a trash conveyor 10. Located below the picker cylinder 3 is an inclined hull-board 11, the lower end of which defines the size of a space 12 between it and the side of the saw cylinder 5 for the escape of hulls knocked loose from the cotton by the threshing cylinders. The hulls passing through space 12 fall into the hopper 8 and thence into the trough 9. Co-operating with the saw cylinder 5 is a doffer roller 13 which removes the cleaned cotton from the saw cylinder and discharges it into a chamber 14, whence it may be drawn through an opening 15 and delivered into the gin.

In operation, seed cotton mixed with trash, hulls, and the like, is first distributed to the hoppers 1, whence it is withdrawn by the feeders 2 in a stream regulated to suit the capacity of the gin on which the machine is mounted. The body of the cotton as it is withdrawn from the hopper 1, is slightly compressed between the rollers 2 and forced down into contact with the picker cylinder 3. The spikes on this cylinder serve to pick the cotton, one lock or boll at a time, from the compressed body of cotton, as it is forced down into contact with them by the fluted rollers 2. It will be seen from the drawing that in the upper half of its rotation, the picker cylinder 3 not only serves to pick the cotton, with extraneous matter, from the compressed body delivered to it by the feed rollers, but also acts to subsequently direct or impel the loosened cotton or trash in the direction of the trash separator formed by the cleaning cylinder 4 and screen 7. The upper half of the cleaning cylinder 4, which receives the cotton and trash from the picker cylinder 3, carries the mixture around to and over the screen 7 below, which screen is of suitable mesh for removing the leaf and other fine trash. After passing over the screen 7, the cotton is delivered back to the picker cylinder 3, the lower half of which directs or throws it into the working zone of suitable hull-extracting mechanism, comprising the hull-board 11, saw cylinder 5, kicker roll 6, and doffer roller 13, previously referred to.

In the operation of this latter mechanism, hulls, sticks and other large extraneous matter knocked loose from the cotton by the cylinders are discharged through the space 12 into the conveyor 10 below. After the three operations above described—that is, feeding, cleaning and extracting—are completed, the cleaned seed cotton is delivered to the gin.

During the preceding operations, the kicker roller 6 will have knocked back a considerable portion of the stream—that is, trash and unopened bolls—and that portion of the cotton entangled with sticks and hulls which the kicker roller 6 rejects is thrown back onto the double-feed picker cylinder 3, the upper portion of which returns it to the cleaning mechanism or cylinder 4, which, after passing it over the screen 7, delivers it back to the lower portion of the picker cylinder 3 which again directs or delivers it onto the saw cylinder 5 of the extracting mechanism.

In the machine constructed and operating as above described, spiked cleaning or breaker cylinders are essential for breaking open the bolls, loosening the leaf trash, and freeing the loose cotton from entanglement with sticks, hulls, etc. It is vitally essential, however, that the free or loosened cotton should be extracted as soon as possible or exposed as little as possible to the action of the picker and cleaning cylinders, or their equivalents, since the loose cotton is very easily roped or otherwise damaged by the action of beaters. If the loose cotton mixed with tight or closed bolls were sent through a sufficient number of breaking or cleaning cylinders to open all such bolls before going to the saw cylinder, or extractor, the loose cotton would be ruined by being roped or twisted and otherwise injured. In the machine of the present invention, which involves a complete combination feeder-cleaner and extractor, with the selective action and return feature of the machine disclosed in my patent referred to, the necessary threshing or beating action can be obtained on that part of the mixture requiring it without any unnecessary beating or threshing of the cotton itself. In practice, it has been found that with the addition of a single cleaning cylinder, as shown, to the machine of my patent referred to, the results obtained in breaking the bolls and freeing cotton entangled with hulls, sticks, and other trash is as effective as a large number of cylinders used in the ordinary way, while injury to the cotton itself incident to the action of a large number of threshing or breaking cylinders is avoided. These cylinders, and the screen co-operating with the cleaning cylinder, effect additional breaking of unopened bolls, freeing of cotton and separation of trash, in the mass rejected by the kicker roller, and this at a point removed from the zone of action of the saw cylinder, so that when the product is returned to the working chamber, the loosened and free cotton may be instantly engaged and removed by the saw cylinder, and the loose hulls and trash escape through the space at the bottom of the hull-board, leaving only a comparatively small residue to be again rejected by the kicker roll and returned for further treatment as before by the picker cylinder.

The percentage of the mixture delivered by the feed rollers that is rejected by the kicker roll and returned to the threshing cylinders depends upon the number of such cylinders used, the speed at which they are rotated, and the character of the bolls to be opened,—some bolls requiring many more blows of a given force to open them than others. It is this difference in the severity of action, or the number of blows required to open some bolls as compared with others, or to free some locks of cotton from hulls or sticks as compared with others, that makes it impractical to confine loose or free locks of cotton to the action of a threshing or breaker cylinder rotating at sufficient speed, or to the action of a sufficient number of them rotating at a lower speed, necessary to break all of the toughest bolls, or to free every lock of cotton from entanglement with sticks or hulls.

In the machine of my present invention, the minimum number of breaker or cleaning cylinders is required, since only that portion of the mixture requiring additional threshing is returned to be acted upon by the cylinders. In the first cycle of operation, a large percentage of the mixture is returned to the threshing cylinders; but in the second and succeeding cycles, while a comparatively small percentage may be sent back a great many times, the locks of cotton freed from the hulls and trash during each cycle of operation are carried by the teeth of the saws beneath the kicker roll as fast as freed, without being returned or thrown back by said kicker roll.

It will thus be seen that the present machine, in common with the machine of my prior patent referred to, provides a selective action on the cotton, in that the free or loosened locks of cotton are instantly removed by the saw cylinder while that part of the mixture requiring further treatment is at once returned to the threshing cylinders. To state the matter in another way, the extracting and cleaning mechanisms are permitted to operate substantially only on that portion of the mixture which they are designed to treat, the saw cylinder to remove the cotton as fast as it is freed from sticks and hulls, and the picker cylinder and one or more cleaning cylinders to break open the bolls and separate the leaf trash. In the machine of the patent referred to, when handling a stream consisting mostly of tough unopened hulls, its single breaker cylinder becomes overloaded by the excessive proportion rejected by the kicker roller, unless the cylinder is rotated at an excessive speed, which is not permissible because of damage to the cotton. Furthermore, the absence of specifically designed mechanism for removing the fine leaf trash makes the machine comparatively ineffective for handling the very roughly harvested cotton.

I wish it understood that while I have shown the best embodiment of my invention now known to me, the same does not reside in the precise arrangement or relative location of parts illustrated, and changes could be made in the arrangement and location of the respective mechanisms described without departing from the spirit of my invention.

Also, it will be obvious to those skilled in the art that more than one cleaning cylinder could be employed if the nature of the harvested cotton being treated should render it desirable to provide for a greater cleaning action than could be accomplished with the use of one cleaning cylinder and screen.

I claim:

1. In a combination cotton feeding, cleaning and extracting machine, feeding mechanism for delivering a regulated stream of the harvested cotton to the machine, cleaning mechanism positioned to receive the delivered cotton, extracting mechanism adapted to act upon cotton mixed with hulls and sticks passing from the cleaning mechanism and comprising a saw cylinder and a co-operating kicker roll, and means for continuously delivering cotton from the cleaning mechanism to the extracting mechanism and for returning that part of the stream of cotton rejected by the kicker roll to the cleaning mechanism.

2. In a combination cotton feeding, cleaning and extracting machine, feeding mechanism for delivering a regulated stream of the harvested cotton to the machine, cleaning mechanism positioned to receive the delivered cotton, extracting mechanism, comprising a saw cylinder and a co-operating kicker roll, co-operating with but independent of said cleaning mechanism and adapted to continuously remove free and loosened locks of cotton from the mixture passing from the cleaning mechanism, and means for continuously delivering cotton from the cleaning mechanism to the extracting mechanism and removing from the zone of action of the saw cylinder that part of the mixture rejected by the kicker roll and returning the same to said cleaning mechanism.

3. In a combination cotton feeding, cleaning and extracting machine, feeding mechanism for delivering a regulated stream of the harvested cotton to the machine, cleaning mechanism positioned to receive the delivered cotton, extracting mechanism, comprising a saw cylinder and a co-operating kicker roll, co-operating with said cleaning mechanism and adapted to continuously feed delivered cotton to said cleaning mechanism and to remove free and loosened locks of cotton from the mixture passing from the cleaning mechanism, and a picker cylinder functioning in co-operation with said feeding, cleaning and extracting mechanism and operating to continuously remove from the zone of action of said saw cylinder that part of the mixture rejected by the kicker roll and to return the same directly to said cleaning mechanism.

4. In a combination cotton feeding, cleaning, and extracting machine, feeding mechanism for delivering a regulated stream of the harvested cotton to the machine, cleaning mechanism, extracting mechanism including a saw cylinder and a co-operating kicker roller, and a double-feed picker roller positioned in co-operative relation with the feeding mechanism, the cleaning mechanism and the extracting mechanism and functioning to feed cotton delivered by the feeding mechanism to the cleaning mechanism, to feed cotton delivered by the cleaning mechanism to the extracting mechanism, and to return that part of the stream of cotton rejected or knocked back by the kicker roller to the cleaning mechanism.

5. In a combination cotton feeding, cleaning, and extracting machine, feeding mechanism for delivering a regulated stream of the harvested cotton to the machine, cleaning mechanism, extracting mechanism comprising a saw cylinder, a co-operating kicker roller and a hull-board, the lower end of which latter defines the size of an opening past the saw cylinder for the escape of hulls and trash, and a double-feed picker roller positioned in co-operative relation with the feeding mechanism, the cleaning mechanism and the extracting mechanism and functioning to feed cotton delivered by the feeding mechanism to the cleaning mechanism, to feed cotton delivered by the cleaning mechanism to the extracting mechanism, and to return that part of the stream of cotton rejected or knocked back by the kicker roller to the cleaning mechanism.

6. In a combination cotton feeding, cleaning, and extracting machine, feeding mechanism for delivering a regulated stream of the harvested cotton to the machine, cleaning mechanism, positioned to have the harvested cotton delivered directly thereto, extracting mechanism co-operating with but independent of said cleaning mechanism and adapted to continuously remove free and loosened locks of cotton from the mixture passing from the cleaning mechanism, and means interposed between the cleaning mechanism and the extracting mechanism for continuously returning that part of the mixture not withdrawn by the extracting mechanism to said cleaning mechanism.

7. In a combination cotton feeding, cleaning and extracting machine, feeding mechanism for delivering a regulated stream of the harvested cotton to the machine, cleaning mechanism, extracting mechanism co-operating with but independent of said cleaning mechanism and adapted to continuously remove free and loosened locks of cotton from the mixture passing from the cleaning mechanism, and means located directly below said feeding mechanism for continuously returning that part of the mixture not withdrawn by the extracting mechanism to said cleaning mechanism.

8. In a cotton feeding, cleaning and extracting machine, feeding mechanism for delivering a regulated stream of the harvested cotton to the machine, cleaning mechanism, extracting mechanism co-operating with said cleaning mechanism and adapted to continuously remove free and loosened locks of cotton from the mixture passing from the cleaning mechanism, and means located directly below said feeding mechanism and operating to discharge the cotton delivered by the feeding mechanism into the cleaning mechanism and to continuously return that part of the mixture not withdrawn by the extracting mechanism to said cleaning mechanism.

9. In a combination cotton feeding, cleaning and extracting machine, feeding mechanism for delivering a regulated stream of the harvested cotton to the machine, cleaning mechanism, extracting mechanism, and means located directly below said feeding mechanism and between the cleaning mechanism and the extracting mechanism and operating to discharge the cotton delivered by the feeding mechanism into the cleaning mechanism, to feed the cotton delivered by cleaning mechanism to the extracting mechanism and to continuously return that part of the mixture not withdrawn by the extracting mechanism to said cleaning mechanism.

In testimony whereof, I have hereunto set my hand.

JOHN E. MITCHELL.